United States Patent
Kwon

(10) Patent No.: US 9,454,231 B2
(45) Date of Patent: Sep. 27, 2016

(54) TRANSPARENT TACTILE LAYER PANEL FOR DISPLAY AND DRIVING METHOD THEREOF

(71) Applicant: Hyundai Motor Company, Seoul (KR)

(72) Inventor: Gideok Kwon, Seoul (KR)

(73) Assignee: Hyundai Motor Company, Seoul (KR)

( * ) Notice: Subject to any disclaimer, the term of this patent is extended or adjusted under 35 U.S.C. 154(b) by 188 days.

(21) Appl. No.: 14/447,024

(22) Filed: Jul. 30, 2014

(65) Prior Publication Data

US 2015/0185844 A1    Jul. 2, 2015

(30) Foreign Application Priority Data

Dec. 26, 2013   (KR) .................. 10-2013-0163781

(51) Int. Cl.
| | |
|---|---|
| G06F 3/045 | (2006.01) |
| G06F 3/01 | (2006.01) |
| G06F 3/041 | (2006.01) |
| G06F 3/044 | (2006.01) |
| G06F 3/0488 | (2013.01) |

(52) U.S. Cl.
CPC ............ *G06F 3/016* (2013.01); *G06F 3/044* (2013.01); *G06F 3/0414* (2013.01); *G06F 3/04886* (2013.01); *G06F 2203/04809* (2013.01)

(58) Field of Classification Search
CPC .................................................. G06F 3/016
USPC ........................................................ 345/174
See application file for complete search history.

(56) References Cited

U.S. PATENT DOCUMENTS

| | | | |
|---|---|---|---|
| 8,199,124 B2 | 6/2012 | Ciesla et al. | |
| 2007/0152974 A1* | 7/2007 | Kim ................... | G06F 3/016 345/168 |
| 2010/0026654 A1* | 2/2010 | Suddreth ............... | G06F 3/0414 345/174 |
| 2010/0283757 A1* | 11/2010 | Wu ......................... | G06F 3/044 345/174 |
| 2012/0085561 A1* | 4/2012 | Sauter ..................... | A61C 1/08 173/213 |

FOREIGN PATENT DOCUMENTS

| | | |
|---|---|---|
| JP | 2005-135876 A | 5/2005 |
| JP | 2008-152767 A | 7/2008 |
| KR | 10-2007-0073125 A | 7/2007 |
| KR | 20100041789 A | 4/2010 |
| KR | 20100046152 A | 5/2010 |
| KR | 10-1340716 B1 | 12/2013 |
| KR | 20140027746 A | 3/2014 |

* cited by examiner

*Primary Examiner* — Jason Olson

(74) *Attorney, Agent, or Firm* — Mintz Levin Cohn Ferris Glovsky and Popeo, P.C.; Peter F. Corless

(57) ABSTRACT

Provided are a transparent tactile layer panel and a method of operating the transparent tactile layer panel. The transparent tactile layer panel includes an ion conducting polymer film on which tin antimony oxide (TAO) coatings are perpendicularly disposed in a matrix type, and generates a surface button by applying an electric signal to each of the TAO coatings and contracting the ion conducting polymer film. In particular, the transparent tactile layer panel includes: an input panel body including an ion conducting polymer film disposed between a screen and a cover film and coated with tin antimony oxide (TAO); a voltage applier configured to apply a voltage to the TAO coating; and a touch detector configured to sense an input when a user inputs into the cover film and detect a spot of the input. Accordingly, the input panel body may provide a three-dimensional effect by the voltage signal applied.

14 Claims, 7 Drawing Sheets

TRANSPARENT TACTILE LAYER PANEL FOR DISPLAY AND DRIVING METHOD THEREOF

CROSS-REFERENCE TO RELATED APPLICATION

This application claims priority to and the benefit of Korean Patent Application No. 10-2013-0163781 filed in the Korean Intellectual Property Office on Dec. 26, 2013, the entire contents of which are incorporated herein by reference.

TECHNICAL FIELD

The present invention relates to a transparent tactile layer panel for display and a method of operating the transparent tactile layer panel. In particular, provided is the transparent tactile layer panel that includes perpendicularly disposed tin antimony oxide (TAO) coatings in a matrix type and an ion conducting polymer film. The transparent tactile layer panel of the present invention generates a surface button by applying an electric signal to the TAO coatings and contracting the ion conducting polymer film.

BACKGROUND

Recently, display devices that include a touch display panel for inputting a signal on a screen using a pen, a finger, and the like have been widely used without a separate input device such as a remote controller and a keypad. The touch display panel may be classified into a pressure sensitive (resistive film) type, a capacitive (capacitance) type, and a touch recognition type of which an imaging device uses an infrared (IR) illumination according to a method of detecting a touch.

In the pressure sensitive type touch display panel in the related art, a pressed spot is detected (e.g., a location of where pressure is applied) by a short-circuit between an upper electrode and a lower electrode by pressing the touch display panel using a finger and a pen as a touch means. Accordingly, an accurate touch input may be obtained. However, since a multi touch is not possible, when many points are touched simultaneously, an error in touch recognition may occur and a reaction speed may be slow.

In the capacitive type touch display panel in the related art, a change in any charge amount is detected to detect the touch spot by touching the touch display panel with a finger and an exclusive pen as a touch means. Accordingly, the touch speed may be improved, and screen clearness and transmittance may be greater than the resistive film type touch display panel. However, due to a physical surface movement of the screen, signal distortion may occur, and thus the accurate touch recognition may not be obtained. Further, since the charge amount of the touch spot needs to be changed, only a limited touch means may be available, and touch recognition by a nail, a glove, or the like may not be obtained.

In the touch recognition type touch display panel in which the imaging device uses the IR illumination in the related art, greater transmittance and greater accuracy may be obtained than the pressure sensitive type or the capacitive type. However, to secure an imaging device viewing angle, an empty space may be further required, and an error in the touch recognition may occur by light-disturbance, such as solar light.

The above information disclosed in this section is merely for enhancement of understanding of the background of the invention and therefore it may contain information that does not form the prior art that is already known in this country to a person of ordinary skill in the art.

SUMMARY

The present invention provides a transparent tactile layer panel for display. The transparent tactile layer panel may have advantages of enabling touch recognition using a physical touch, thereby reducing light-disturbance such as solar light in conventional touch panels and simultaneously generating a physical button on a touch screen surface while maintaining a high resolution of display.

In one aspect, the present invention a transparent tactile layer panel for display, may include: an input panel body including an ion conducting polymer film disposed between a screen and a cover film; a voltage applier configured to apply a voltage to the TAO coating; and a touch detector configured to sense an input when a user inputs into the cover film and detect a location of the input. In particular, the ion conducting polymer film may be coated with at least one or more of tin antimony oxide (TAO) coatings and the input panel body may have a three-dimensional effect by the voltage signal applied.

The ion conducting polymer film may be coated with a first TAO coating and a second TAO coating. The first TAO coating may be coated on one side (e.g., a first side) of the ion conducting polymer film adjacent to the cover film; the second TAO coating may be coated on the other side (e.g., a second side) of the ion conducting polymer film; and the first TAO coating and the second TAO coating may be perpendicularly disposed in a matrix type. In addition, a third TAO coating may be coated on the screen.

The voltage applier may be configured to apply a first polarity voltage to the first TAO coating, and apply a second polarity voltage different from the first polarity voltage to the second TAO coating and the third TAO coating. Since one polarity is positive and the other polarity is negative, the first TAO coating may be stretched and the second TAO coating may be contracted, therefore, a convex shape of the input panel body may be formed and have a three-dimensional effect. The touch detector may be configured to recognize the input of the user when the second TAO coating and the third TAO coating contact each other after the input panel body has a three-dimensional effect. When the touch detector recognizes the input of the user, the touch detector may be configured to detect an X-axial coordinate in the second TAO coating and detect a Y-axial coordinate in the third TAO coating to detect an input spot of the user.

In another aspect, the present invention provides a method of operating a transparent tactile layer panel for display that may include a screen through which an image may be output, a cover film that may be touched by a user, and an ion conducting polymer film which may be disposed between the screen and the cover film. In particular, the ion conducting polymer film may be coated with a first TAO coating on one side adjacent to the cover film, and coated with a second TAO coating on the other side, and further, a third TAO coating may be coated on the screen. The method may include: applying a predetermined polarity voltage to each of the first, second, and third TAO coatings; sensing an input by a user; and detecting an input location where the user input is sensed.

The first TAO coating and the second TAO coating may be perpendicularly disposed in a matrix type. A first polarity voltage may be applied to the first TAO coating, and a second polarity voltage different from the first polarity voltage may be applied to the second TAO coating and the third TAO coating. Since one polarity may be positive and the other polarity is negative, the first TAO coating may be stretched; the second TAO coating may be contracted, and a convex shape of the input panel body may be formed and have a three-dimensional effect.

The application of the predetermined polarity voltage to each of the first, second, and third TAO coatings may be performed when a three-dimension start signal of the input panel body is received. The sensing of the input may include recognizing the input of the user when the second TAO coating and the third TAO coating contact each other. In the detecting of the input location where the input of the user is sensed an X-axial coordinate may be detected in the second TAO coating and a Y-axial coordinate may be detected in the third TAO coating to detect the input location of the user.

As described above, according to various exemplary embodiments of the present invention, installation and usability may be improved due to a compact panel module. In particular, when the touch screen including the transparent tactile layer panel of the present invention is used in a vehicle, a driver may operate the touch screen by a physical touch, and the risk of traffic accidents due to an increase in a front observation ratio may be reduced.

BRIEF DESCRIPTION OF THE DRAWINGS

The above and other objects, features and advantages of the present invention will be more clearly understood from the following detailed description taken in conjunction with the accompanying drawing.

Figure 1:
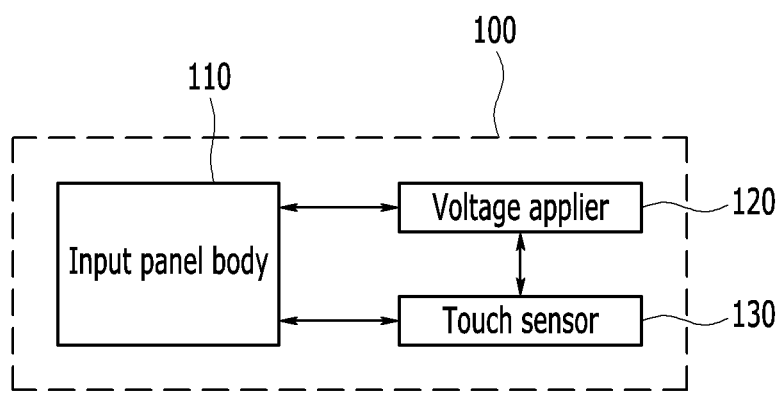
FIG. 1 illustrates an exemplary configuration of a transparent tactile layer panel for display according to an exemplary embodiment of the present invention.

Reference numerals set forth in the FIGS. 1-7 include reference to the following elements as further discussed below:

100: Transparent tactile layer panel
110: Input panel body
111: Screen
112: Ion conducting polymer film
113: Cover film
114: First transparent TAO coating
115: Second transparent TAO coating
116: Third transparent TAO coating
117: Pixel
118: Ion
120: Voltage applier
130: Touch detector

DETAILED DESCRIPTION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Throughout this specification and the claims that follow, when it is described that an element is "coupled" to another element, the element may be "directly coupled" to the other element or "electrically coupled" to the other element through a third element. Like reference numerals designate like elements throughout the specification. In order to elucidate the present invention, parts that are not related to the description will be omitted. Various exemplary embodiments of the present invention will hereinafter be described in detail with reference to the accompanying drawings.

FIG. 1 illustrates configuration of an exemplary transparent tactile layer panel for display according to an exemplary embodiment of the present invention. In an exemplary embodiment, a transparent tactile layer panel 100 may include an input panel body 110, a voltage applier 120, and a touch detector 130. The input panel body 110 may refer to a physical structure configuring the transparent tactile layer panel 100. In addition, the voltage applier 120 and the touch detector 130 may be an electric circuit and/or hardware/software which may be configured to operate the input panel body 110 by detecting an input on the input panel body 110.

In certain exemplary embodiments, both the voltage applier 120 and the touch detector 130 may be integrated to be implemented, or separated to be individually implemented as a logic classification according to a function thereof. Further, the logic function classification of the voltage applier 120 and the touch detector 130 may be included for convenience of description, one integrated constituent element may perform all functions performed by the voltage applier 120 and the touch detector 130, or some functions performed in any one constituent element may be performed in other constituent elements without departing from the nature thereof. Hereinafter, a structure and a physical operation of the input panel body 110 will be described.

Figure 2:
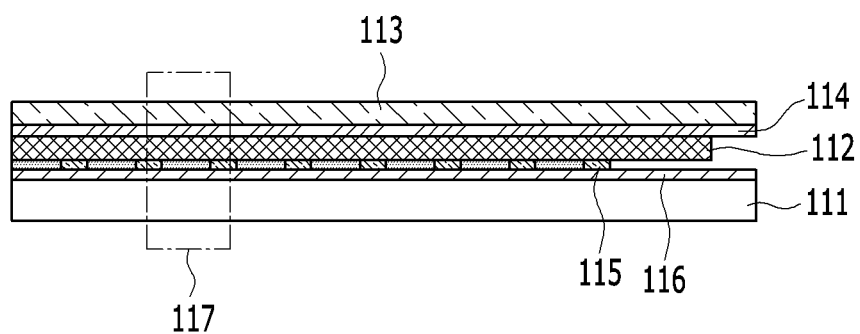
FIG. 2 illustrates an exemplary cross-sectional view of a body of the transparent tactile layer panel for display according to an exemplary embodiment of the present invention.
Figure 3:
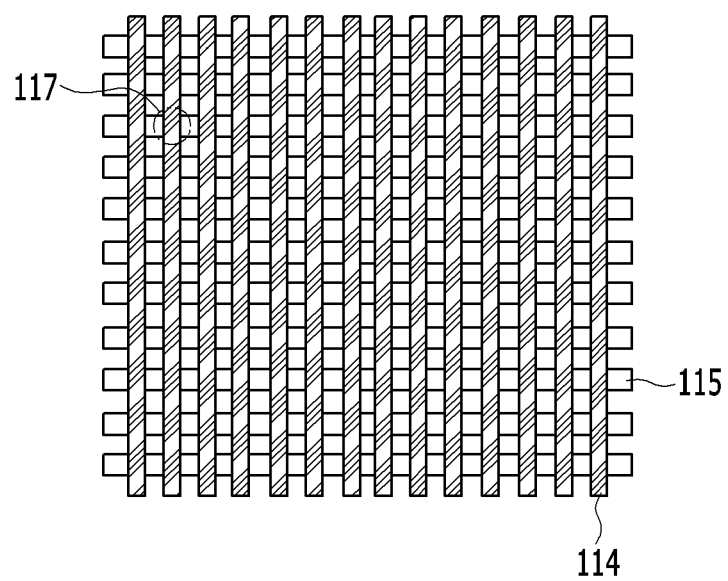
FIG. 3 illustrates an exemplary top view of the body of the transparent tactile layer panel for display according to an exemplary embodiment of the present invention.
Figure 4:
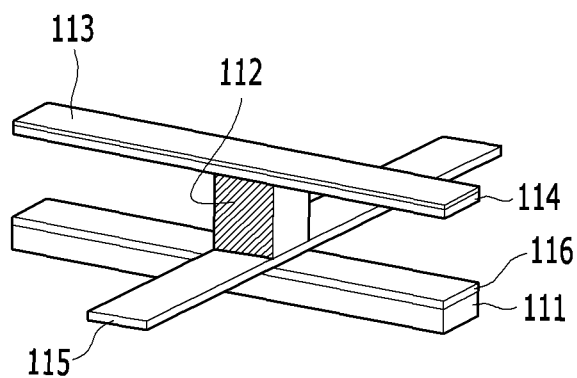
FIG. 4 illustrates an exemplary pixel 117 of an exemplary transparent tactile layer panel for display according to an exemplary embodiment of the present invention.

In FIG. 2, provided is a cross-sectional view illustrating an exemplary transparent tactile layer panel according to an exemplary embodiment of the present invention. In FIG. 3, provided is a top view illustrating an exemplary transparent tactile layer panel. Further, FIG. 4 illustrates an enlarged view of an exemplary pixel 117 of an exemplary transparent tactile layer panel according to an exemplary embodiment of the present invention.

In an exemplary embodiment, the input panel body 110 may include: a screen 111; a third transparent tin antimony oxide (TAO) which may be applied on the top of the screen; an ion conducting polymer film 112; a first transparent TAO coating 114 coated on the top of the ion conducting polymer film 112; a second transparent TAO coating 115 coated on the bottom of the ion conducting polymer film 112; and a cover film 113.

The screen 111 may be a base substrate of the input panel body 110, and when functioning as a touch screen of an electronic device, the screen 111 may be an image display surface of the electronic device or a substrate additionally attached onto the image display surface. The screen 111 may not be deformed even though predetermined attraction or repulsion acts between the upper ion conducting polymer films 112. Accordingly, the screen 111 may be made of a substantially hard material, and for example, may be a glass substrate made of transparent glass. The third transparent TAO coating 116 coated on the top of the screen 111 may be TAO coating (e.g., conductive plate), and be a flexible and transparent material. The third transparent TAO coating 116 may be connected to the voltage applier 120, and may be applied with a voltage through the voltage applier 120. Further, the third transparent TAO coating 116 may be connected to the touch detector 130 to obtain a coordinate of a touch point.

In certain exemplary embodiments, the ion conducting polymer film 112 may be made of an ion-electron active polymer such as an ionic polymer gel. In addition, the ion-electron active polymer may be, but not limited to, an ionomeric polymer or an electric active polymer such as carbon nanotube. Accordingly, the ion conducting polymer film 112 may be an ion-electron active polymer, or the electric active polymer.

The first transparent TAO coating 114 may be coated on one side of the ion conducting polymer film 112 adjacent to the cover film 113, and the second transparent TAO coating 115 may be coated on the other side thereof. The first transparent TAO coating 114 and the second transparent TAO coating 115 may be TAO coatings like the third transparent TAO coating 116. In addition, one of the first transparent TAO coating 114 and the second transparent TAO coating 115 may be connected to each voltage applier 120, and may be applied with a voltage through the voltage applier 120. Further, the first transparent TAO coating 114 and the second transparent TAO coating 115 may be connected to the touch detector 130, and the second transparent TAO coating may form an X-axial coordinate.

As illustrated in FIG. 3, the first transparent TAO coating 114, the second transparent TAO coating 115, and the third transparent TAO coating 116 may be arranged in a matrix type over about an entire surface or in a partial area of the input panel body 110. Accordingly, at each cross point of a plurality of second transparent TAO coatings 115 and a plurality of third transparent TAO coatings 116 with the ion conducting polymer film 112 therebetween, a plurality of pixels 117 arranged in a matrix type may be defined in FIG. 4.

The pixels 117 arranged in the matrix type may form X-axial and Y-axial coordinates by the second transparent TAO coating 115 and the third transparent TAO coating 116 which may be connected with the touch detector 130. Accordingly, the pixels 117 may be individually connected with a switchable active device in the touch detector 130, and sensing may be individually performed according to a sensed signal using the configuration. The cover film 113 may be a user contact surface which the user may contact (e.g., press or apply pressure to) when performing an input. In addition, the cover film 113 may be made of a transparent and deformable polymer film and the like, to be more easily deformed when the user contacts or pushes the user cover film 113 using a finger or the like. Examples of polymer may be not particularly limited.

Figure 5:
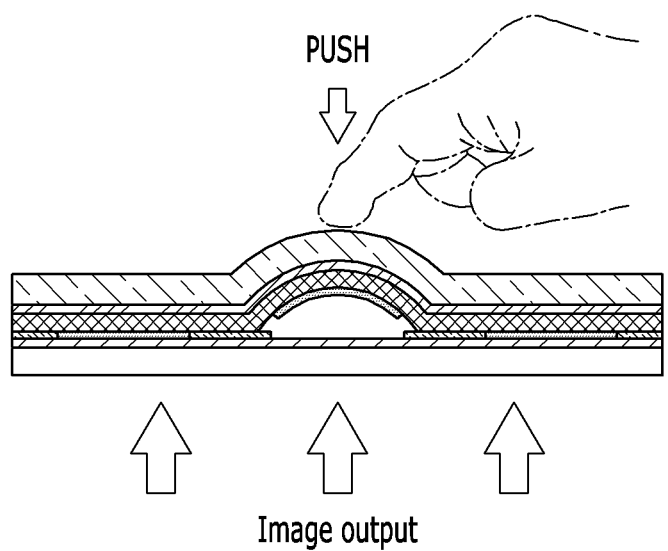
FIG. 5 illustrates a perspective view of an exemplary transparent tactile layer panel for display and an exemplary operation mode thereof according to an exemplary embodiment of the present invention.

FIG. 5 illustrates a perspective view of an exemplary transparent tactile layer panel for display and an exemplary operation mode thereof according to an exemplary embodiment of the present invention. In FIG. 5, the voltage applier 120 of the transparent tactile layer panel 100 according to an exemplary embodiment of the present invention may be configured to generate a three-dimension start signal of the input panel body 110. The three-dimension start signal may be generated by a control signal applied from the exterior.

The voltage applier 120 may be executed by a controller to apply a voltage to each of the first transparent TAO coating 114, the second transparent TAO coating 115, and the third transparent TAO coating 116 of the input panel body 110 according to the three-dimension start signal. Accordingly, the input panel body 110 may have a three-dimensional effect in a pixel to which the voltage is applied. The voltage applier 120 may also be configured to apply a first polarity voltage to the first transparent TAO coating 114 and apply a second polarity voltage which is different from the first polarity voltage to the second transparent TAO coating 115 and the third transparent TAO coating 116, to provide a three-dimensional effect of the ion conducting polymer film 112 according to the three-dimension start signal.

Particularly, the voltage applier 120 may be configured to apply a positive voltage to the first transparent TAO coating 114 and apply a negative voltage to the second transparent TAO coating 115 and the third transparent TAO coating 116, respectively. Accordingly, attraction may be maintained between the first transparent TAO coating 114 and the second transparent TAO coating 115, and repulsion may be maintained between the second transparent TAO coating 115 and the third transparent TAO coating 116.

Figure 6:
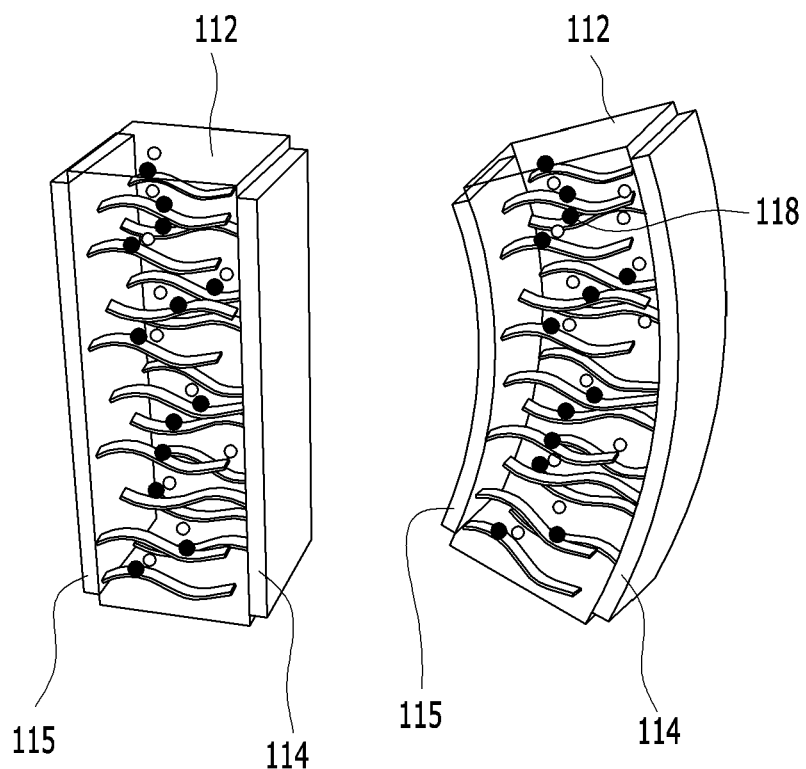
FIG. 6 illustrates an exemplary operating principle of an exemplary transparent tactile layer panel for display according to an exemplary embodiment of the present invention.

FIG. 6 illustrates an exemplary operating principle of the transparent tactile layer panel according to an exemplary embodiment of the present invention. As illustrated in FIG. 6, when the positive voltage is applied to the first transparent TAO coating 114 at both ends of the ion conducting polymer film 112 and the negative voltage is applied to the second transparent TAO coating 115, respectively, free ions 118 in the ion conducting polymer film 112 may move toward the first transparent TAO coating 114. Accordingly, the first transparent TAO coating 114 may be stretched, and the second transparent TAO coating 115 may be contracted.

Further, since the negative voltage may be applied to the third transparent TAO coating 116 fixed to the screen 111 to maintain repulsion with the second transparent TAO coating 115, a convex shape of the ion conducting polymer film 112 may be formed upward. Accordingly, the input panel body 110 may have a three-dimensional effect as a user interface button shape in the pixel to which the voltage is applied. In addition, the touch detector 130 may be configured to detect a touch point when a finger of the user pushes the three-dimensional physical button by pushing force of a predetermined intensity or greater (e.g., when a pressure applied to the button is a predetermined pressure or greater). When the three-dimensional physical button is pressed by force of a predetermined intensity or greater, a space formed between the ion conducting polymer film 112 and the screen 111 may be reduced, and the second transparent TAO coating 115 may contact the third transparent TAO coating 116. In particular, the touch detector may be configured to determine whether the input from the user exists on the corresponding coordinate.

As described above, the second transparent TAO coating 115 and the third transparent TAO coating 116 may be formed in the matrix type and the pixel 117 may be formed at the cross point thereof. Since the negative voltage may be applied to both the second transparent TAO coating 115 and the third transparent TAO coating 116, when the second transparent TAO coating 115 and the third transparent TAO coating 116 contact each other, a capacitance value may be changed in the pixel 117 at the contact point. Accordingly, the touch detector 130 may be configured to detect a change in the capacitance value of the pixel 117 based on the voltage applied by the voltage applier 120, and detect an X-axial coordinate position of the pixel 117 in the second transparent TAO coating 115 and a Y-axial coordinate position in the third transparent TAO coating 116, respectively.

Thereafter, the touch detector 130 may be executed by a controller to perform a control function that corresponds to the physical button selected by the user, and transfer a three-dimension end signal to the voltage applier 120. In other words, the user may feel the physical button of the three-dimensional input panel body 110 by tactility and simultaneously selecting a desired menu of the transparent tactile layer panel 100 to operate the interface.

Figure 7:
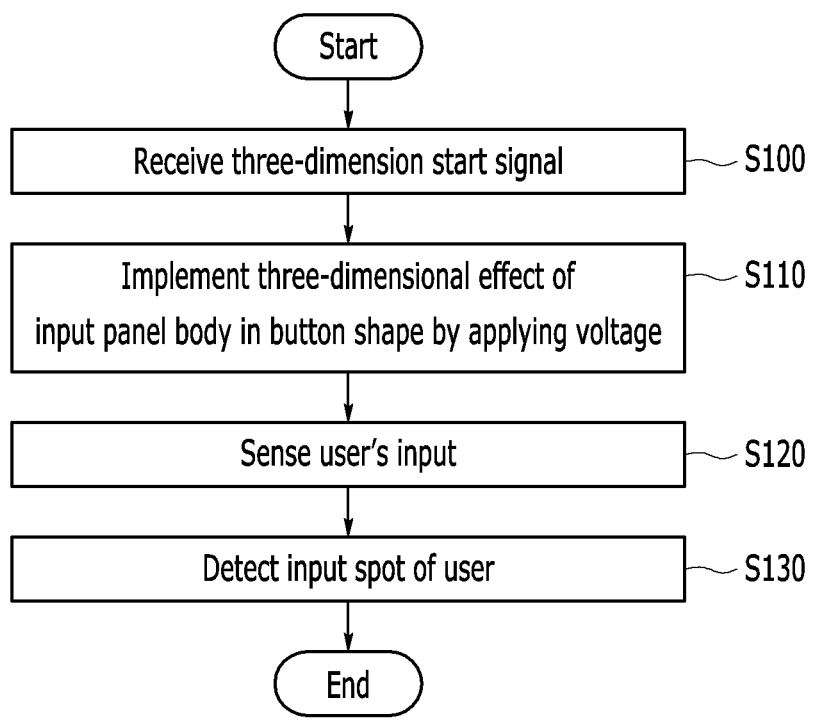
FIG. 7 is a flowchart illustrating an exemplary method of operating an exemplary transparent tactile layer panel for display according to an exemplary embodiment of the present invention.

Hereinafter, a method of operating a transparent tactile layer panel according to another exemplary embodiment of the present invention will be described in detail with reference to FIG. 7. FIG. 7 illustrates an exemplary method of operating an exemplary transparent tactile layer panel according to another exemplary embodiment of the present invention.

In the driving method of the transparent tactile layer panel according to an exemplary embodiment of the present invention, the voltage applier 120 may be configured to start by receiving a three-dimension start signal of the input panel body 110 (S100). The three-dimension start signal may be generated by an image signal output from the screen or a control signal applied extraneously. In step S100, when the voltage applier 120 receives the three-dimension start signal of the input panel body 110 to provide a three-dimensional effect in the input panel body 110 as a button shape, the voltage applier 120 may be configured to apply a voltage to the input panel body 110 (S110). The voltage applier 120 may be configured to apply a positive voltage to the first transparent TAO coating 114, a negative voltage to the second transparent TAO coating 115, and a negative voltage to the third transparent TAO coating 116, respectively.

In step S110, when the input panel body 110 has a three-dimensional effect as the button shape, the touch detector 130 may be configured to detect an input of the user (S120). In addition, input of the user may be a force of predetermined intensity or greater by which a finger of the user or an input pen pushes (e.g., applies pressure to) the three-dimensional physical button. In step S120, when the input of the user is detected, the touch detector 130 may be configured to detect an input location of the user (S130). Since the second transparent TAO coating 115 and the third transparent TAO coating 116 may be formed in the matrix type, the input spot of the user may be configured to detect the X-axial coordinate in the second transparent TAO coating 115 and the Y-axial coordinate in the third transparent TAO coating 116, respectively to detect the input location point. When the touch detector 130 detects the input spot of the user, the operation mode of the transparent tactile layer panel according to an exemplary embodiment of the present invention may be terminated.

While this invention has been described in connection with what is presently considered to be exemplary embodiments, it is to be understood that the invention is not limited to the disclosed embodiments. On the contrary, it is intended to cover various modifications and equivalent arrangements included within the spirit and scope of the appended claims.

What is claimed is:

1. A transparent tactile layer panel for display, comprising:
   an input panel body including an ion conducting polymer film disposed between a screen and a cover film;
   a voltage applier configured to apply a voltage to tin antimony oxide (TAO) coating; and
   a touch detector configured to sense an input when pressure is applied into the cover film and detect a location of the input;
   wherein the ion conducting polymer film is coated with at least one or more of tin antimony oxide (TAO) coating,
   wherein the input panel body has a three-dimensional effect by the voltage signal applied; and the ion conducting polymer film is coated with a first TAO coating and a second TAO coating; the first TAO coating is coated on one side of the ion conducting polymer film adjacent close to the cover film; the second TAO coating is coated on the other side of the ion conducting polymer film; and the first TAO coating and the second TAO coating are perpendicularly disposed in a matrix type; and a third TAO coating is coated on the screen.

2. The transparent tactile layer panel for display of claim 1, wherein the voltage applier is configured to apply a first polarity voltage to the first TAO coating, and apply a second polarity voltage having different polarity of the first polarity voltage to the second TAO coating and the third TAO coating.

3. The transparent tactile layer panel for display of claim 2, wherein the first TAO coating is stretched and the second TAO coating is contracted, wherein a convex shape of the input panel body is formed to provide a three dimensional effect.

4. The transparent tactile layer panel for display of claim 1, wherein the touch detector is configured to recognize the input of a user when the second TAO coating and the third TAO coating contact each other after the input panel body has a three-dimensional effect.

5. The transparent tactile layer panel for display of claim 4, wherein, when the touch detector recognizes the input, the touch detector is configured to detect an X-axial coordinate in the second TAO coating and detect a Y-axial coordinate in the third TAO coating to detect an input spot of the user.

6. The transparent tactile layer panel for display of claim 1, wherein the ion conducting polymer film is made of an ion-electron active polymer.

7. The transparent tactile layer panel for display of claim 1, wherein the ion conducting polymer film include a carbon nanotube.

8. A method of operating a transparent tactile layer panel for display which includes a screen which outputs an image, a cover film which a user contacts, and an ion conducting polymer film disposed between the screen and the cover film, wherein the ion conducting polymer film is coated with a first tin antimony oxide (TAO) coating on one side adjacent to the cover film, and coated with a second TAO coating on the other side, and a third TAO coating is coated on the screen, comprising:

applying a predetermined polarity voltage to each of the first, second, and third TAO coatings;

sensing a user input; and detecting an input location where the user input is sensed.

9. The method of claim 8, wherein the first TAO coating and the second TAO coating are perpendicularly disposed in a matrix type.

10. The method of claim 9, wherein a first polarity voltage is applied to the first TAO coating and a second polarity voltage different from the first polarity voltage is applied to the second TAO coating and the third TAO coating.

11. The method of claim 10, wherein the first TAO coating is stretched and the second TAO coating is contracted and a convex shape of the input panel body is formed to provide a three dimensional effect.

12. The method of claim 8, wherein the application of the predetermined polarity voltage to each of the first, second, and third TAO coatings is performed when a three-dimension start signal of the input panel body is received.

13. The method of claim 8, wherein the sensing of the user input includes recognizing the input of the user when the second TAO coating and the third TAO coating contact each other.

14. The method of claim 8, wherein, in the detection of the input spot where the input of the user is sensed, an X-axial coordinate is detected in the second TAO coating and a Y-axial coordinate is detected in the third TAO coating to detect the input spot of the user.

* * * * *